United States Patent
Mayer et al.

(10) Patent No.: US 11,360,187 B2
(45) Date of Patent: Jun. 14, 2022

(54) RADAR SENSOR SYSTEM AND METHOD FOR OPERATING A RADAR SENSOR SYSTEM

(71) Applicant: Robert Bosch GmbH, Stuttgart (DE)

(72) Inventors: Marcel Mayer, Lonsee (DE); Klaus Baur, Mietingen (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 16/771,200

(22) PCT Filed: Jan. 12, 2019

(86) PCT No.: PCT/EP2019/050718
§ 371 (c)(1),
(2) Date: Jun. 9, 2020

(87) PCT Pub. No.: WO2019/174796
PCT Pub. Date: Sep. 19, 2019

(65) Prior Publication Data
US 2020/0371197 A1 Nov. 26, 2020

(30) Foreign Application Priority Data
Mar. 15, 2018 (DE) .......................... 102018203934.8

(51) Int. Cl.
*G01S 7/03* (2006.01)
*G01S 13/87* (2006.01)
*G01S 13/931* (2020.01)

(52) U.S. Cl.
CPC .............. *G01S 7/032* (2013.01); *G01S 13/87* (2013.01); *G01S 13/931* (2013.01)

(58) Field of Classification Search
CPC . G01S 7/03; G01S 7/032; G01S 13/87; G01S 13/931
See application file for complete search history.

(56) References Cited

U.S. PATENT DOCUMENTS 3,028,593 A * 4/1962 Alford ...................... G01S 7/03
342/158
3,953,856 A * 4/1976 Hammack ............... G01S 1/302
342/458

(Continued)

FOREIGN PATENT DOCUMENTS

DE 102015218542 A1 3/2017
EP 2881752 A1 6/2015

(Continued)

OTHER PUBLICATIONS

International Search Report for PCT/EP2018/050718, dated Apr. 24, 2019.

*Primary Examiner* — Peter M Bythrow
(74) *Attorney, Agent, or Firm* — Norton Rose Fulbright US LLP; Gerard Messina

(57) ABSTRACT

A radar sensor system including: a defined number of HF components; each HF component having at least one antenna for emitting and/or receiving radar waves and at least one antenna control for operating the at least one antenna; and a synchronization network that is connected to all HF components and via which an operating frequency of all HF components is synchronizable by at least one of the HF components.

14 Claims, 2 Drawing Sheets

(56) References Cited

U.S. PATENT DOCUMENTS

| | | | | |
|---|---|---|---|---|
| 3,996,590 A * | 12/1976 | Hammack | G01S 13/87 | 342/465 |
| 5,225,839 A * | 7/1993 | Okurowski | G01S 7/025 | 342/174 |
| 5,623,270 A * | 4/1997 | Kempkes | H01Q 1/005 | 342/174 |
| 6,323,735 B1 * | 11/2001 | Welland | H03L 7/099 | 257/531 |
| 8,633,851 B2 * | 1/2014 | Vacanti | H01Q 3/34 | 342/149 |
| 9,261,587 B1 * | 2/2016 | Gwinn, IV | G01S 7/03 | |
| 10,649,081 B2 * | 5/2020 | Rincon | H01Q 21/065 | |
| 2005/0285773 A1 * | 12/2005 | Hartzstein | G01S 13/345 | 342/70 |
| 2008/0088499 A1 * | 4/2008 | Bonthron | G01S 13/931 | 342/104 |
| 2008/0278370 A1 * | 11/2008 | Lachner | G01S 7/03 | 342/200 |
| 2009/0086867 A1 * | 4/2009 | Banu | H04L 7/02 | 375/356 |
| 2010/0265998 A1 * | 10/2010 | Nakada | H01Q 23/00 | 375/219 |
| 2012/0194377 A1 * | 8/2012 | Yukumatsu | G01S 7/35 | 342/70 |
| 2013/0278306 A1 * | 10/2013 | Wixforth | G01S 13/42 | 327/141 |
| 2014/0266866 A1 * | 9/2014 | Swirhun | G01S 7/03 | 342/188 |
| 2015/0002330 A1 * | 1/2015 | Binzer | G01S 7/032 | 342/175 |
| 2015/0153445 A1 * | 6/2015 | Jansen | G01S 13/931 | 701/93 |
| 2016/0146931 A1 * | 5/2016 | Rao | H01Q 1/3233 | 342/59 |
| 2016/0187464 A1 * | 6/2016 | Ginsburg | G01S 7/4008 | 342/168 |
| 2016/0245898 A1 * | 8/2016 | Li | G01S 7/032 | |
| 2018/0024233 A1 * | 1/2018 | Searcy | G01S 7/4008 | 342/125 |
| 2018/0210067 A1 * | 7/2018 | Bilik | G01S 13/87 | |
| 2018/0210079 A1 * | 7/2018 | Hammerschmidt | H01Q 1/3233 | |
| 2018/0267165 A1 * | 9/2018 | Steinbuch | G01S 13/87 | |
| 2018/0342804 A1 * | 11/2018 | Hasegawa | H01Q 3/2682 | |
| 2019/0317207 A1 * | 10/2019 | Schroder | H04B 7/0413 | |

FOREIGN PATENT DOCUMENTS

| | | |
|---|---|---|
| JP | H08262132 A | 10/1996 |
| JP | 2021515221 A | 6/2021 |

* cited by examiner

RADAR SENSOR SYSTEM AND METHOD FOR OPERATING A RADAR SENSOR SYSTEM

FIELD

The present invention relates to a radar sensor system. The present invention further relates to a method for operating a radar sensor system. The present invention further relates to a computer program product.

BACKGROUND INFORMATION

The market for driver assistance systems is presently going through a radical change. While in the past few years, mainly low-priced sensor systems were prioritized, the trend at present is toward highly autonomous driving with a considerably higher level of sophistication of the sensor systems. In the case of vehicles having a higher degree of driver assistance functions or an automated driving function, an increasing number of sensors for controlling and regulating those functions are installed. The sensors installed in the vehicles may be radar sensors or LIDAR sensors, for example, and must have a preferably high accuracy. The functional safety and the reliability of the autonomous or semi-autonomous driving functions may be ensured by using precise sensors.

SUMMARY

It is an object of the present invention to provide a radar sensor system having an improved operating characteristic, in particular an increased radar resolution.

According to a first aspect of the present invention, the object may achieved with the aid of an example radar sensor system according to the present invention, including:
- a defined number of HF components;
- each HF component having at least one antenna for emitting and/or receiving radar waves and at least one antenna control for operating the at least one antenna; and
- a synchronization network that is connected to all HF components and via which an operating frequency of all HF components is synchronizable by at least one of the HF components.

In this way, a high coherence or synchronicity is advantageously provided between all HF components, one of the HF components serving as the master and all HF components being connected to one another via a synchronization network. The result is that an improved operating characteristic of the radar sensor system is supported in the form of a high distance and angle resolution. An emergency operation function of the radar sensor system may advantageously also be provided, for example.

According to a second aspect of the present invention, the object may be achieved with the aid of an example method for operating a radar sensor system, including the steps:
- emitting and/or receiving radar waves with the aid of a defined number of HF components with the aid of at least one antenna; and
- synchronizing an operating frequency of the HF components with the aid of a synchronization network that is connected to the defined number of HF components, one defined HF component serving as the master of the synchronization.

Advantageous refinements of the radar sensor system are described herein.

One advantageous refinement of the example radar sensor system in accordance with the present invention is that the synchronization network has short line lengths in relation to the radar resolution. A disadvantageous effect of long lines in the form of losses is reduced in this way. A running time of the signals may thus be kept to a minimum, for example, the latter thus being incorporated into the distance resolution only to a minor extent and therefore advantageously having to be compensated for only to a minor extent.

A further advantageous refinement of the example radar sensor in accordance with the present invention system provides that a defined relation is established between the feed line length and the bin width. In this way, a compensation effort for signals of the HF components may be kept to a minimum in a defined manner.

A further advantageous refinement of the example radar sensor system in accordance with the present invention is that the length of the feed lines is designed in such a way that a change in the bin width by a tenth is provided through the radar sensor system. A reasonably practicable ratio between the bin width and the feed line lengths is implementable in this way.

A further advantageous refinement of the example radar sensor system in accordance with the present invention is that the HF components are situated in such a way with regard to one another that defined groups of the HF components are spaced apart from one another in a specified close manner, the defined groups of the HF components being connected with the aid of a synchronization line. It is thus advantageously achieved that the HF components that are closely spaced apart from one another do not need to be compensated for. In this case, a defined line length of the synchronization network is provided between the groups formed in such a way, in the case of four HF components overall, only a first pair of HF components having to be compensated for with regard to a second pair of HF components.

A further advantageous refinement of the example radar sensor system in accordance with the present invention is that the HF components are situated in such a way with regard to one another that defined groups of HF components are spaced apart from one another in a specified close manner, a further HF component having a feed line of the synchronization network whose length differs from the feed lines of the group of HF components in such a way that a mixing point in time of the further HF component is offset with regard to a mixing point in time of the groups of HF components during the operation of the radar sensor system. In this way, an essentially identical running time of the signals is provided by a group, thus facilitating a signal processing in that only the HF component that serves as the master must be compensated for via the different feed line length.

A further advantageous refinement of the example radar sensor system in accordance with the present invention is that each HF component may serve as the master of the synchronization. A high flexibility in selecting the master is supported in this way.

Further advantageous refinements of the example radar sensor system in accordance with the present invention are that the HF components are situated in such a way that they are rotated by approximately 45 degrees toward one another in their intended installed positions. A line length is minimized thereby and the signals may be supplied more easily.

Below, preferred exemplary embodiments of the radar sensor system according to the present invention are elucidated in greater detail with reference to the highly simplified schematic figures.

DETAILED DESCRIPTION OF EXAMPLE EMBODIMENTS

Figure 1:
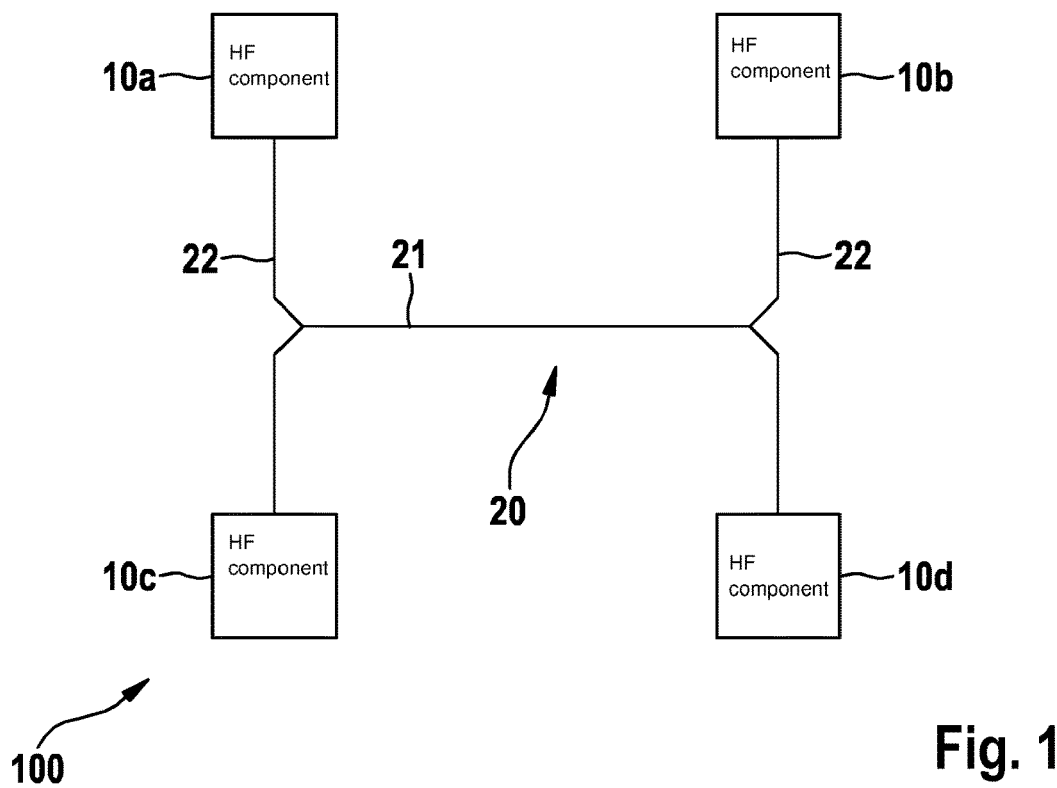
FIG. 1 shows a schematic illustration of a first specific embodiment of a provided radar sensor system in accordance with the present invention.

In the figures, the same constructive elements have the same reference numerals in each case.

Present-day radar sensors usually have many HF channels for generating and receiving radar waves. Here, all HF components may be operated simultaneously during normal operation. Radar sensors of this type may be subdivided into several partial sensors in the case of a symmetrical implementation.

Each partial sensor may thus have a corresponding portion of HF components or HF channels of the radar sensor. In this way, a partial sensor of the radar sensor may for example allow for an autonomous driving of a vehicle at a limited speed in the case of a possible emergency operation. This may also be implemented if the components of other partial sensors are no longer functional.

The design of the radar sensor system may for example include conventional, cost-effective basic components. By parallelizing several components of the same type, it is possible to implement an improvement in the power and accuracy of the radar sensor system. Moreover, a redundancy for providing a reliable function of the system is made possible by using several components of the same type. In this way, an emergency operation of the radar sensor system may be implemented in a technically simple manner. For this purpose, a redundancy in the case of clock generation must, however, also be present in addition to the HF components and the microcontrollers. The HF components might, for example, be antenna controls or amplifiers designed in the form of MMICs (monolithic microwave integrated circuits).

Due to the fact that all HF components are supplied with a useful frequency or basic frequency by one shared clock generator, the radar sensor system has a high coherence. The different HF components may be, in particular, operated using an identical operating frequency, whereby a redundant and coherent clock supply of several HF components may be made possible.

At least a part of the HF components used in the radar sensor system are preferably supplied with a clock or a useful frequency. During normal operation, all HF components or antenna controls of the radar sensor system may be supplied with the same clock by at least one clock generator and thus all data may be computed with one another.

During normal operation of the radar sensor system, a simultaneous clock supply of all antenna controls or HF components takes place by at least one clock generator. As a result of the clock supply from a single source, a high coherence may be implemented. Alternatively or additionally, the clock supply may be designed as multiple clock generators operated in parallel. If, for example, one clock generator is defective, at least one further clock generator may be activated or switched on via the control unit for the purpose of generating a frequency.

FIG. 1 shows a schematic illustration of a first specific embodiment of a provided radar sensor system 100. Radar sensor system 100 has four HF components 10a . . . 10d that are designed as MMICs. Here, the number four is merely exemplary; provided radar sensor system 100 may also have fewer or more than four HF components. A synchronization network 20 is further apparent, to which all HF components 10a . . . 10d are functionally connected (for example galvanically conductive, galvanically non-conductive) and which is used for synchronizing the operating frequency or LO frequency of all HF components 10a . . . 10d, one HF component 10a . . . 10d serving as the synchronizing master component and the others as slave HF components.

Radar sensor system 100 further has antenna controls of HF components 10a . . . 10d. For the sake of simplicity, further component parts of HF components 10a . . . 10d that are necessary for transmitting and receiving radar waves, such as for example antennas, amplifiers, oscillators, etc., are not illustrated in the figures.

Geometric lengths of the lines of synchronization network 20 between two HF components in each case are advantageously short in relation to a radar resolution of radar sensor system 100, whereby a running time of signals within synchronization network 20 is adapted to the radar resolution of radar sensor system 100.

This results in a group of two HF components 10a-10c and 10b-10d in each case, which do not have to be compensated for with regard to one another, since they are connected via short lines within the group. As a result, there is only one necessity for compensating for the closely spaced-apart groups of HF components with regard to one another, which corresponds to a 50% compensation of all involved HF components (10a . . . 10d) in the case of the arrangement of FIG. 1.

The present invention may advantageously also be applied to other numbers of HF components 10a . . . 10n. For example, a total of six HF components may be situated according to the provided principle at 2×3 or 3×2 HF components that are spaced apart from one another in a specified close manner (not illustrated in the figures).

It is provided that the synchronizing HF master component serves as a source of the synchronization signal ("master") during the operating time of radar sensor system 100, all HF components being functionally connected to one another via synchronization network 20.

In a radar sensor system, usually one HF component is assigned the role of the master, which assumes the high frequency generation, and the other HF components are supplied by same with the HF synchronization signal. The HF synchronization signal is necessary to provide a high coherence of HF components 10a . . . 10d, whereby a high angle resolution of radar sensor system 100 may be implemented. For this purpose, specific components that are conventional are used for high frequency generation and for further signal processing.

The increasingly higher costs for the HF component development, for example in the case of higher mask costs for smaller node sizes, show, however, that the use of several module components of the same type may be more cost-effective, although the actual silicon area is larger. In this way, the present invention yields the advantageous possibility to implement a cost-effective and redundant radar sensor system.

It is provided in accordance with the present invention that one HF component $10a \ldots 10d$ assumes the above-named task of synchronizing remaining HF components $10a \ldots 10d$, the synchronization master being connected to all HF components via synchronization network 20.

Figure 2:
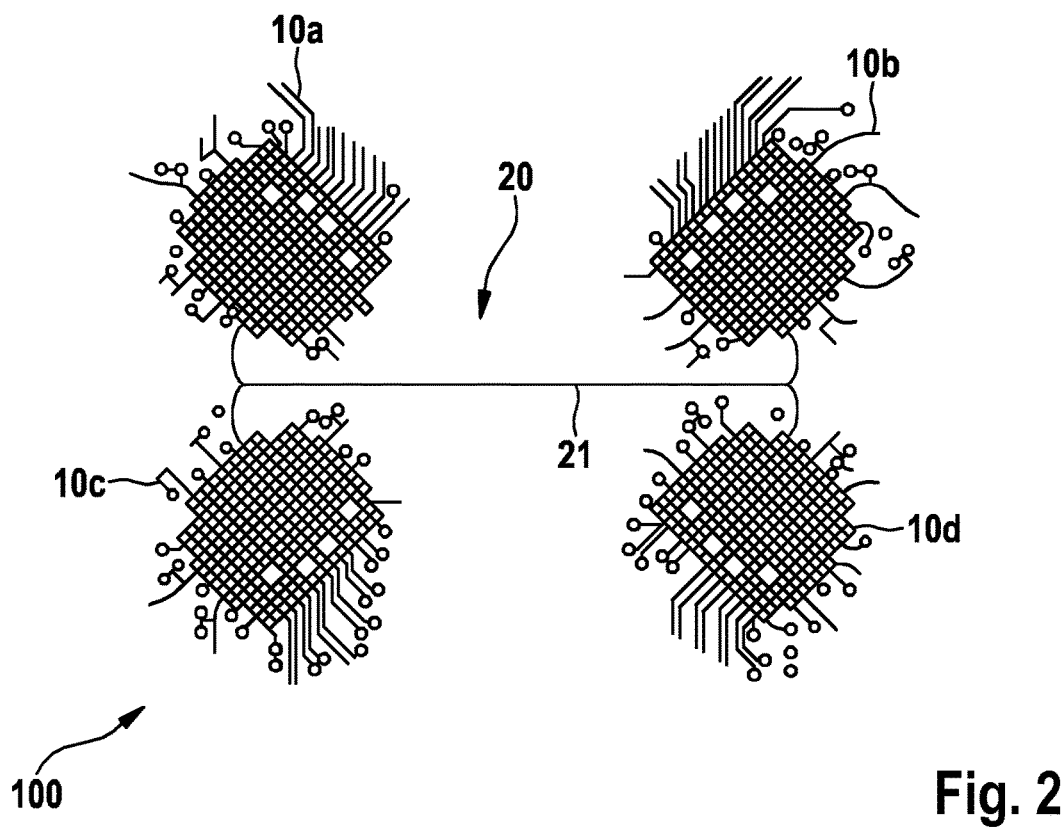
FIG. 2 shows a schematic illustration of the provided radar sensor system of FIG. 1 in somewhat greater detail.

FIG. 2 shows the arrangement of radar sensor system 100 of FIG. 1 in a more detailed degree, it being apparent that HF components $10a \ldots 10d$ are situated with regard to one another in their intended installed positions (for example on a circuit board) at a defined angle, for example below 45 degrees to allow for a shorter length of electrical lines of synchronization network 20 in this way, thus optimizing a detection accuracy of radar sensor system 100.

By situating HF components $10a \ldots 10d$ in this type of rotated manner, a preferably short synchronization line 21 is advantageously implemented. As a result, short running times of the signals are thus made possible on synchronization line 21, HF components $10a \ldots 10d$ still having sufficient room for supplying the signals of the emitting and receiving channels.

"Short" in this context means small with regard to a bin width that essentially represents the distance resolution of radar sensor system 100 and corresponds to a value of 15 cm in the case of a hub of 1 GHz. If, for example, 1/10 bin width is considered to be acceptable, the electrical length of synchronization line 21 may not be greater than 3 cm. The factor two originates in this case from the two paths (round trip) of the radar.

For the distribution of the power, T-dividers 22 are additionally used for synchronization line 21, since they have good transmission values from the supply line of T-divider 22 to the branches (and vice versa) of T-divider 22. In the present case, the supply line is understood to mean the central, horizontal section in the manner of presentation of FIG. 2, the branches to the supply line being situated vertically.

The signal is subjected to an attenuation, which may be assumed to be 1 dB per cm, for example, over length l of line 21 from the left-hand side having HF components 10a, 10c to the right-hand side having HF components 10b, 10d. This path thus does not have an unnecessarily high attenuation across T-dividers 22.

The length between the ports of HF components 10a, 10c and HF components 10b, 10d is, however, very short so that a higher degree of coupling attenuation is acceptable in this path. In sum, a typical T-divider 22 may thus be used, since the ratio of the output power to the required input power is thereby achieved. Typical attenuation values are in this case:

Branch to feed line: −3.5 dB
Branch to branch: −7 dB

In this context, a branch is understood to mean a connection of T-divider 22 from output to output.

Figure 3:
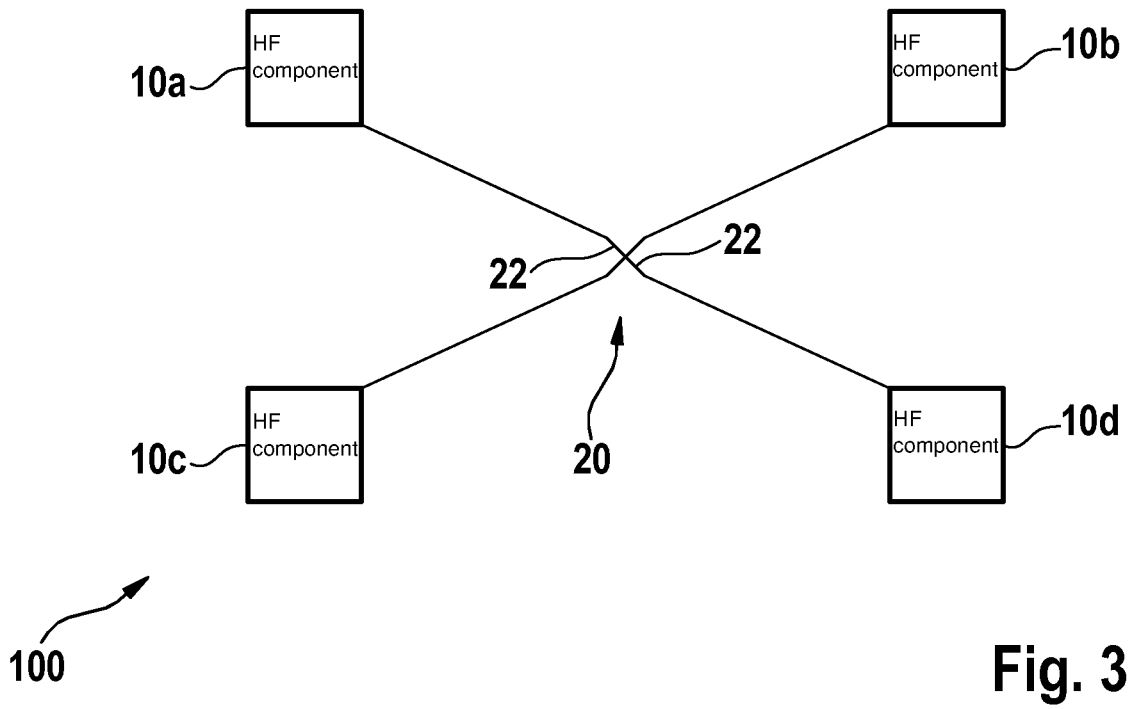
FIG. 3 shows a schematic illustration of a further specific embodiment of the provided radar sensor system in accordance with the present invention.

In addition to the preferred specific embodiment of FIGS. 1 and 2, the present invention may be used to implement a further specific embodiment of radar sensor system 100, as is illustrated in FIG. 3. In this case, however, the result is not the two pairs of HF components 10a, 10c and 10b, 10d having identical mixing points in time, but one defined individual HF component (for example HF component 10a) having a mixing point in time that is offset with regard to that of the other HF components (for example HF components $10b \ldots 10d$) of radar sensor system 100 during the operation of radar sensor system 100.

It is taken into consideration that a mixer uses the same LO frequency for mixing at a different point in time, since the wave needs a certain period of time to cover the distance on the line. This running time difference becomes apparent in a difference in the distance estimation, since the distance estimation essentially implements a conversion of the estimated running time of the radar waves from the emitter to the target and back into a distance using a propagation speed of the waves.

Thus a "gravity center" of the mixing points in time named above is closer to HF components $10b \ldots 10d$ than to HF component 10a, which is preferably compensated for digitally. This is achieved in that three HF components (for example HF components $10b \ldots 10d$) essentially have the same length of the feed lines of synchronization network 20, a fourth HF component (for example HF component 10a) having a length of a feed line of synchronization network 20 that is different therefrom.

The gate between HF components 10a, 10c according to FIG. 3 results, when contemplated, in an approximately optimal power distribution in synchronization network 20 by using two T-dividers 22.

Both approaches of FIGS. 1, 2 and 3 explained above have in common the possibility of employing different HF components $10a \ldots 10d$ as the master for generating the local oscillator frequency and thus being used in a radar sensor system 100 having an emergency operation function.

In the advantageous specific embodiment according to FIGS. 1, 2, HF component 10a and HF component 10c may be used as the master due to the fact that they are closely spaced apart from one another, without the need of further adaptations, for example, in the digital compensation.

The second-named approach according to FIG. 3 is to be preferred if the HF channels of HF components 10a, 10b are spaced far apart with regard to the pair of HF components 10c, 10d, so that a large aperture may be implemented, without incurring excessively great losses as a result of the HF feed lines.

The example method in accordance with the present invention may be advantageously used not only in a radar sensor system, but also in any product including several HF components. The provided radar sensor system is preferably used in the automotive industry.

Figure 4:
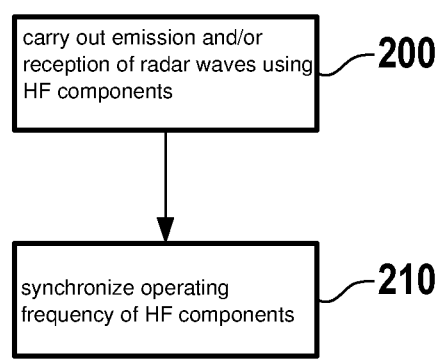
FIG. 4 shows a schematic flow chart of an example method for operating a radar sensor system in accordance with the present invention.

FIG. 4 shows a schematic flow chart of an example method for operating a radar sensor system 100 in accordance with the present invention.

In a step 200, an emission and/or a reception of radar waves with the aid of a defined number of HF components $10a \ldots 10n$ is carried out with the aid of at least one antenna.

In a step 210, a synchronization of an operating frequency of HF components $10a \ldots 10n$ is carried out with the aid of a synchronization network 20 that is connected to a defined number of HF components $10a \ldots 10d$, one defined HF component $10a \ldots 10n$ serving as the master of the synchronization.

The example method may be advantageously implemented as software that runs in a control unit (not illustrated) of radar sensor system 100. In this way, a simple changeability of the method is advantageously supported.

Those skilled in the art may thus also proceed and implement specific embodiments that are not described or that are described only partially, without departing from the core of the present invention.

What is claimed is:

1. A radar sensor system, comprising:
    a plurality of HF components, each of the HF components having at least one antenna for emitting and/or receiving radar waves and at least one antenna control configured to operate the at least one antenna; and a synchronization network that connects all of the HF components to one another such that one of the HF components, acting as a master, synchronizes an operating frequency of the one of the HF components and others of the HF components, acting as slaves, via the synchronization network, wherein the synchronization is performed using one or more time offsets and the synchronization network includes respective branching lines for each of the others of the HF components arranged so that at least two of the others of the HF components have a same time offset relative to the one of the HF components.

2. The radar sensor system as recited in claim 1, wherein the synchronization network includes a central synchronization line from which the branching lines branch, and the central synchronization line has a short line length in relation to a radar resolution of the radar sensor system.

3. The radar sensor system as recited in claim 2, wherein there is a defined relation between the length of the central synchronization line and a bin width of the radar sensor system.

4. The radar sensor system as recited in claim 3, wherein the length of the central synchronization line is designed in such a way that a change in the bin width by a tenth is provided by the radar sensor system.

5. The radar sensor system as recited in claim 1, wherein each of the HF components is configured to serve as the master for controlling the synchronization of the HF components.

6. The radar sensor system as recited in claim 1, wherein the HF components are situated in such a way that physical spatial orientations of the HF components are rotated by approximately 45 degrees toward one another in their installed positions.

7. A method comprising:
emitting and/or receiving radar waves using a plurality of HF components of a radar sensor system with the aid of at least one respective antenna of the plurality of HF components; and synchronizing an operating frequency of the HF components using a synchronization network that connects all of the plurality of HF components to one another such that one of the HF components, serving as a master, synchronizes an operating frequency of the one of the HF components and others of the HF components, acting as slaves, via the synchronization network, wherein the synchronization is performed using one or more time offsets and the synchronization network includes respective branching lines for each of the others of the HF components arranged so that at least two of the others of the HF components have a same time offset relative to the one of the HF component.

8. The radar system as recited in claim 1, wherein:
the branching lines group the HF components into a plurality of component groups that each includes at least two of the HF components; and
with respect to each respective one of the plurality of component groups, all respective HF components of the respective component group have a same time offset relative to the one of the HF components.

9. The radar system as recited in claim 8, wherein the one of the HF components, acting as the master, is grouped with one of the others of the HF components within one of the component groups whose time offset is 0.

10. The radar system as recited in claim 8, wherein the synchronization network further includes a central synchronization line from which the branching lines branch.

11. The radar system as recited in claim 10, wherein, with respect to each of the component groups, all of the branching lines of the respective component group branch from a same branching point of the central synchronization line.

12. The radar system as recited in claim 11, wherein, for each pair of immediately adjacent ones of the branching points, a ratio of (a) a length of the central synchronization line between the respective pair of branching points to (b) bin width of the radar system is not greater than 3 cm/$\frac{1}{10}$ bin width.

13. The radar system as recited in claim 11, wherein the respective branching point of a first of the component groups, of which the one of the HF component is not a part, is arranged on the central synchronization line closer to the one of the HF components than the respective branching point of a second of the component groups, of which the one of the HF components is not a part, and the time offset of the first one of the component groups is less than the time offset of the second one of the component groups.

14. The radar sensor system as recited in claim 1, wherein each of the others of the HF components has a respective direct connection to the one of the HF components without any other one of the HF component intervening in the respective direct connection.

* * * * *